(12) United States Patent
Chu et al.

(10) Patent No.: US 7,147,378 B2
(45) Date of Patent: Dec. 12, 2006

(54) LOW FRICTION, ABRASION-RESISTANT BEARING MATERIALS

(75) Inventors: Chaokang Chu, Hockessin, DE (US); James R. Hanrahan, Newark, DE (US)

(73) Assignee: Gore Enterprise Holdings, Inc., Newark, DE (US)

( * ) Notice: Subject to any disclaimer, the term of this patent is extended or adjusted under 35 U.S.C. 154(b) by 44 days.

(21) Appl. No.: 10/783,004

(22) Filed: Feb. 19, 2004

(65) Prior Publication Data
US 2005/0185867 A1   Aug. 25, 2005

(51) Int. Cl.
*F16C 17/00* (2006.01)

(52) U.S. Cl. .................. 384/300; 384/902; 384/909; 384/42

(58) Field of Classification Search ................ 384/300, 384/908, 909, 902, 276, 42
See application file for complete search history.

(56) References Cited

U.S. PATENT DOCUMENTS

| | | |
|---|---|---|
| 2,689,380 A | 9/1954 | Tait |
| 3,806,216 A | 4/1974 | Orkin et al. |
| 3,950,599 A | 4/1976 | Board, Jr. .................. 428/236 |
| 4,074,512 A | 2/1978 | Matt ............................ 57/140 |
| 4,096,227 A | 6/1978 | Gore |
| 4,238,137 A | 12/1980 | Furchak et al. |
| 5,498,654 A | 3/1996 | Shimasaki et al. .......... 524/432 |
| 5,677,031 A | 10/1997 | Allan et al. ................. 428/137 |
| 5,792,525 A | 8/1998 | Fuhr et al. .................. 428/35.7 |
| 6,019,920 A | 2/2000 | Clough ........................ 264/127 |
| 6,485,608 B1 | 11/2002 | McDonald et al. |
| 6,548,188 B1 | 4/2003 | Yanase et al. .............. 428/626 |

FOREIGN PATENT DOCUMENTS

| | | |
|---|---|---|
| JP | 61228122 | 10/1986 |
| JP | 01307514 A | 12/1989 |
| JP | 3-121135 A | 5/1991 |

*Primary Examiner*—Lenard A. Footland
(74) *Attorney, Agent, or Firm*—Carol A. Lewis White

(57) ABSTRACT

A friction-reducing abrasion resistant bearing material is described. The material comprises a monolithic, porous polytetrafluoroethylene (ePTFE) having dispersed therein a wear-resistant thermosetting or thermoplastic resin material.

28 Claims, 8 Drawing Sheets

LOW FRICTION, ABRASION-RESISTANT BEARING MATERIALS

BACKGROUND OF THE INVENTION

1. Field of the Invention

This invention relates to improved bearing materials comprising PTFE. These bearing materials are suitable for a variety of applications in, for example, the aerospace, industrial, medical and agricultural industries.

2. Description of Prior Art

It is known in the art to utilize self-lubricating bearings and materials to provide reduced friction and reduced wear in a range of load-bearing applications. These bearings are expected to withstand damage during use and installation. Further, the self-lubricating bearings are typically subject during use to a variety of conditions such as heat and pressure, as well as chemical attack from a variety of substances.

The choice of a bearing material to meet a given need depends on the specific conditions and performance required and tends to be a complex engineering task in view of the many parameters which must be taken into account. A representative list of conditions that are to be taken into account might include, for example, velocity, pressure (including amount of load, direction of load, and speed of impact of load), dynamic friction, static friction, temperature, chemical exposure, lubrication, dimensional stability, geometrical fit, nature of the counter surface, and susceptibility to fluid lubrication erosion ("cavitation").

Conventional friction management materials and systems include roller bearings, ball bearings, and plain bearings. In the plain bearing arena, many different forms of plastics bearing materials comprising a plastic matrix having various fillers and/or porous bonding layers are known. Many of them include polytetrafluoroethylene (PTFE), which is widely known for its low coefficient of friction. PTFE also provides the benefit of being stable under a wide range of temperatures and is inert to most chemicals. However, the wear characteristics, excessive creep and the bond strength to substrates of PTFE are poor, so different supporting materials are incorporated with the PTFE in various ways. Some of these supporting materials include metals, which are believed to draw heat away from the system and thus result in improved wear. In addition, some metals, such as lead, are thought to contribute to the lubricity of the system. However, the science of mechanisms in these systems is not fully understood.

Many products have been made available in this field, and a variety of patents exist, directed to bearing and other friction-reducing materials incorporating polytetrafluoroethylene (PTFE). For example, many bearing materials incorporate PTFE floc, or short fibers, which are incorporated into a resin material and spray coated onto a substrate. U.S. Pat. No. 3,806,216 describes materials which are representative of this type of construction. In another form, PTFE film has been skived from a solid, full-density PTFE block, then laminated to fabric or metal backers and bonded together with various resin systems. U.S. Pat. No. 4,238,137, to Furchak, describes materials which are representative of this type of construction. PTFE fibers formed into woven or non-woven sheets or fabrics, which are then impregnated with resin (e.g., U.S. Pat. No. 4,074,512) and/or laminated to an epoxy or other backing material (e.g., U.S. Pat. No. 3,950,599) have also been used as bearing materials. PTFE floc or particles have been incorporated into a thermoplastic material, then molded and/or machined into bearings. Further, PTFE dispersions, sometimes combined with fillers, have been dried or otherwise bonded on a sintered metal layer/metal substrate or other metal substrate (e.g., U.S. Pat. Nos. 2,689,380; 5,498,654 and 6,548,188 and Japanese Unexamined (Kokai) Patent Application No. 3-121135).

U.S. Pat. No. 5,792,525 to Fuhr et al., teaches bearing parts formed from one or more layers of a densified expanded PTFE material which can be machined or otherwise formed to the desired shape. Such materials exhibit good resistance to creep under a load; however, the wear limitations of such materials limit their use in many demanding bearing applications.

As can be seen from the wide range of PTFE-containing materials described, some solution has been developed for virtually every bearing application; however, the market continues to need lower friction, lower wear systems that enable lower power consumption and longer bearing life. In addition, environmental concerns regarding lead have resulted in a search for lead-free materials that perform as well as, or better than, the current lead-containing materials.

Accordingly, a need has existed in the field of self-lubricated bearing materials and bearing articles for new bearings exhibiting enhanced wear resistance and low friction relative to conventionally available materials.

SUMMARY OF THE INVENTION

This invention is a unique wear resistant composite bearing material that solves many of the current problems of the self lubricated bearings market. The bearing material comprises monolithic, or continuous, porous polytetrafluoroethylene materials combined with other polymer materials in a unique configuration which has heretofore not been achieved in the art.

Numerous forms of porous, monolithic PTFE exist and are suitable in bearing materials of this invention. For example, U.S. Pat. No. 5,677,031, to Allan et al., and U.S. Pat. No. 6,019,920, to Clough, are directed to monolithic porous PTFE structures comprising an open network of fused granular PTFE particles that define a tortuous network of voids throughout the structure. Another example of a suitable porous, monolithic PTFE suitable for a bearing material of the present invention is expanded PTFE, characterized by a structure of nodes interconnected by fibrils, and the appearance of this node and fibril structure can vary depending on whether the material is expanded in one direction (e.g., uni-axial) or in multiple directions (e.g., bi-axial, multi-axial, etc.). Other suitable forms of porous, monolithic PTFE materials suitable in the present invention may include monolithic PTFE sheets which are perforated or otherwise modified to create porosity and other reticulated PTFE forms.

It has been surprisingly discovered that these porous, monolithic PTFE materials, whether in the form of membranes, rods, tubes or other suitable forms, can be imbibed with polymer resins comprising thermosetting resins or thermoplastic resins, such as described in more detail herein, and bearings made from the resulting imbibed structures exhibit improved wear resistance over that which has been achieved in the prior art.

Polymer resin materials suitable for imbibing into the ePTFE structures can include a wide range of thermosetting resins including, but not limited to, epoxies and their hybrids, phenolics, polyesters, acrylates, polyimides, polyurethanes, cyanate esters, bismaleimide, polybenimidazole, and the like. The preferred thermosetting resins are those which have high thermal stability (e.g., epoxies, polyamide-imide, cyanate esters and phenolic resins, etc.). In addition, many thermoplastic resins including, but not limited to, polyetheretherketone (PEEK), polyetherketone (PEK), polyaryletherketone (PAEK), liquid crystal polymer (LCP), polyimide (PI), polyetherimide (PEI), acetals, acrylics, fluoropolymers, polyamides, polycarbonates, polyolefins, polyphenylene oxides, polyesters, polystyrenes, polysulfones, polyethersulfones, polyphenylene sulfide, polyvinyl chloride, and the like, may also be imbibed into the ePTFE structures to form low friction, wear-resistant composites.

Depending on the desired application and performance of the resulting composite material, the polymer resin volume percent of solids and volume ratio of solids (PTFE to polymer resin) may vary significantly. Materials with resin volume percents ranging from 40% to 80% have resulted in suitable composites in accordance with the present invention; however, higher volume percents and lower volume percents are also contemplated to be within the scope of suitable composites for the low friction, abrasion-resistant materials of this invention.

Depending on the particular performance desired, the imbibed ePTFE composite materials may also incorporate one or more fillers to alter or tailor the performance to meet a specific performance requirement. For example, a filler such as graphite or boron nitride may be included to lower the composite coefficient of friction (COF). Further, fillers such as aluminum oxide, titanium dioxide, glass fiber, or carbon may be used to improve wear resistance, even if such fillers might tend to increase the COF.

DESCRIPTION OF THE DRAWINGS

The foregoing summary, as well as the following detailed description of the invention, will be better understood when read in conjunction with the appended drawings. For purposes of illustrating the invention, there are shown in the drawings embodiments which are presently preferred. It should be understood, however, that the invention is not limited to the precise arrangements and instrumentalities shown. In the drawings.

DETAILED DESCRIPTION OF PREFERRED EMBODIMENTS

Figure 1:
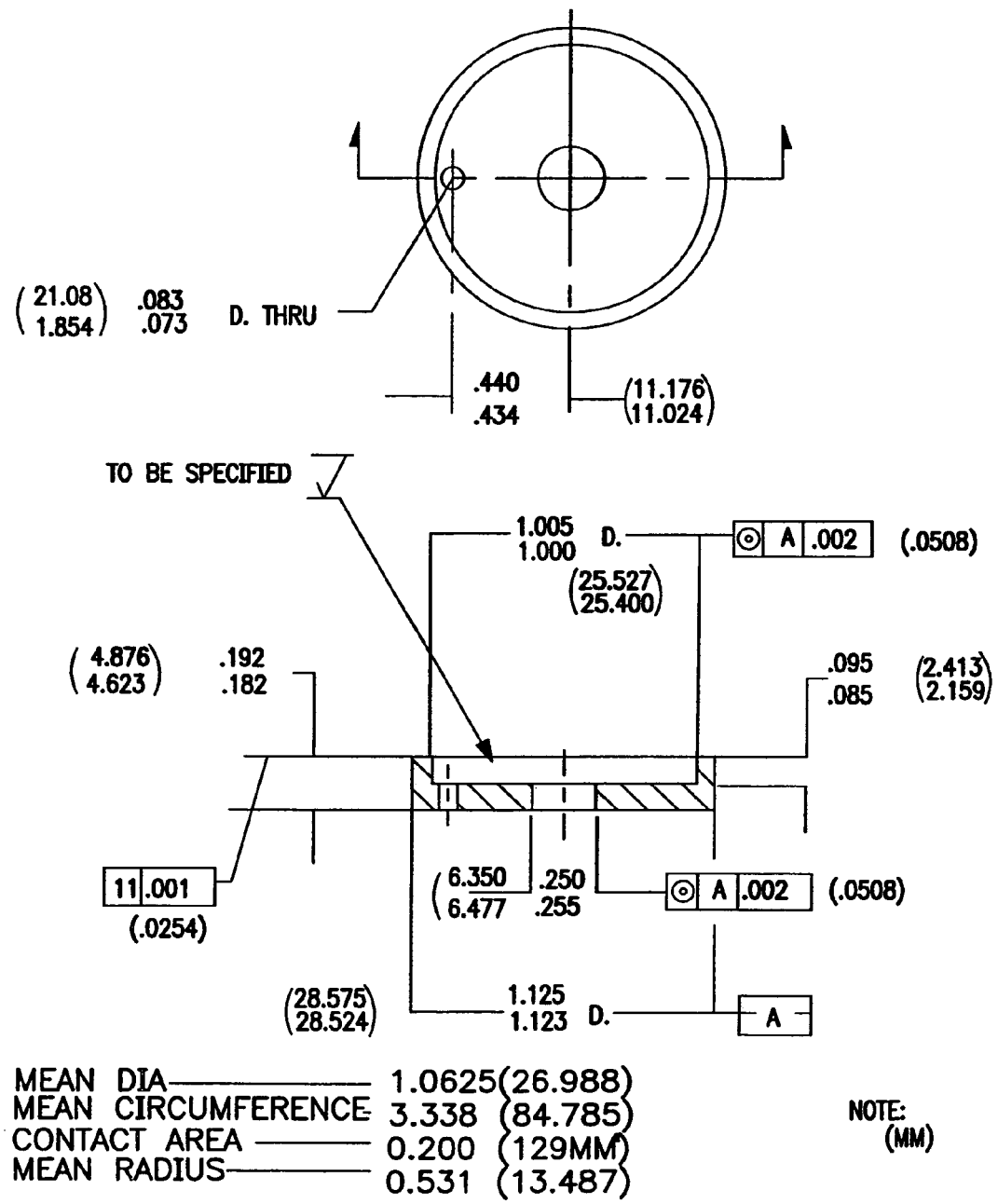
FIGS. 1 and 2 are schematic representations of the rotating test specimen and the test fixture, respectively, for performing wear testing on the materials of the invention.

In the current invention, composite bearing materials are made with a coefficient of friction (COF) similar to pure PTFE, but with a significantly lower wear rate. These novel bearing materials are achieved by imbibing wear resistant polymer resin materials within specific porous, monolithic PTFE structures.

In order to create such a bearing material, it is important to start with a porous, monolithic PTFE, as noted earlier herein. For example, U.S. Pat. No. 5,677,031, to Allan et al., and U.S. Pat. No. 6,019,920, to Clough, are directed to monolithic porous PTFE structures comprising an open network of fused granular PTFE particles that define a tortuous network of voids throughout the structure. Another example of a suitable porous, monolithic PTFE suitable for a bearing material of the present invention is expanded PTFE, characterized by a structure of nodes interconnected by fibrils, and the appearance of this node and fibril structure can vary depending on whether the material is expanded in one direction (e.g., uni-axial) or in multiple directions (e.g., bi-axial, multi-axial, etc.). Other suitable forms of porous monolithic PTFE materials suitable in the present invention may include monolithic PTFE sheets which are perforated or otherwise modified to create porosity and other reticulated PTFE forms.

As described earlier, polymer materials suitable for imbibing into the PTFE structures of this invention can include a wide range wear-resistant polymer resins. The term "wear-resistant polymer resins," as used herein, is intended to refer to polymer resins have a modulus greater than the modulus of PTFE (about 0.7 Gpa), more preferably a modulus of at least 1.5 GPa, and most preferably a modulus of at least 2 GPa. Suitable thermosetting resins including, but not limited to, epoxies and their hybrids, phenolics, polyesters, acrylates, polyimides, polyurethanes, cyanate esters, bismaleimide, polybenimidazole, and the like. The preferred thermosetting resins are those which have high thermal stability (e.g., epoxies, polyamide-imide, cyanate esters and phenolic resins, etc.). In addition, many thermoplastic resins including, but not limited to, polyetheretherketone (PEEK), polyetherketone (PEK), polyaryletherketone (PAEK), liquid crystal polymer (LCP), polyimide (PI), polyetherimide (PEI), acetals, acrylics, fluoropolymers, polyamides, polycarbonates, polyolefins, polyphenylene oxides, polyesters, polystyrenes, polysulfones, polyethersulfones, polyphenylene sulfide, polyvinyl chloride, and the like, may also be imbibed into the porous monolithic PTFE structures to form low friction, high wear composites.

While the thermosetting or thermoplastic polymer resin(s) enhance the wear resistance of the resulting articles, the selection of the polymer resin is also important for the success of the composite for a number of other reasons, and the particular resin selection may vary depending on the requirements of a given application. For a typical industrial bearing application, the imbibed resin also provides the following beneficial features: completely or partially fills the voids in PTFE, provides bonding capability to other substrates, reduces or prevents deformation under load (i.e., creep resistance), and provides dimensional rigidity. We have found in certain preferred embodiments that the material that best balances all of these properties is an epoxy resin comprising a combination of an epoxy, a curing agent and an additive, i.e., curing accelerator. In a particularly preferred embodiment, the epoxy can be any of bisphenol A, bisphenol F, epoxy cresol novolac, epoxy phenol novolac, and many other commercially available epoxy materials. The curing agent can be, but is not limited to, aliphatic amines, aromatic amines, amidoamines, polyamides, amine complexes, dicyandiamide, urea, imidazoles, polyphenols, anhydrides and acids. However, it is important to note that epoxies may not be the material of choice for every application. For example, if an application required extremely high temperature resistance (450° F.), a polyimide would be better suited for a preferred embodiment. Again, depending on the desired end use, the choice of polymer resin or resins will vary.

In order to incorporate the thermosetting or thermoplastic polymers into the ePTFE structures, the polymers can be put into liquid form by melting or solvating. One preferred method in making these types of composites is to imbibe a solvated polymer into at least a portion of the void space of the PTFE structure. This method allows for easy control of the polymer loading, as well as simple processing to achieve the final result. In such a process, all ingredients in thermosetting or thermoplastic resins are dissolved in solvent(s). Solvent(s) not only dissolve the ingredients but also function as a wetting agent to wet the porous monolithic PTFE material. The PTFE material is imbibed with this blend. There are a variety of processes for imbibing a PTFE structure, such as dip coating, kiss-roll coating, spray coating, brush coating, vacuum coating, and comparable techniques apparent to one of skill in the art. The solvent(s) is removed after imbibing to leave all solid ingredients in the voids of the PTFE material.

The imbibed ePTFE composite material, sometimes referred to as a "pre-preg," can then be put into a form for use as a bearing article. This can be done in one preferred embodiment by bonding the "pre-preg" to a backing or substrate material. Such a backing material can be made of metal, a themosetting material or other suitable substrate to which the pre-preg can bond. For example, a steel sheet and an epoxy mold are two representative forms of suitable substrate. In a preferred embodiment comprising bonding to a steel substrate, the pre-preg can be bonded to the substrate by the following steps: a steel plate substrate is cleaned with methyl ethyl ketone (MEK); the epoxy resin/ePTFE "pre-preg" is put on the steel plate and a release film is placed on the pre-preg side opposite the steel plate. A metal sheet is placed on top of the release sheet. The assembly is put on a Carver press unit and subjected to a compressive load between 40 and 1000 psi, at a temperature of 160–200° C. for a thirty minute duration. During this heating and compressing step, the imbibed epoxy resin flows in the ePTFE structure and is distributed in the porosity, cures (i.e. becomes cross-linked) and bonds to the steel, resulting in a substantially pore-free structure bonded to the steel substrate. The result is a bearing article which has a low friction surface, a tenacious bond between the composite material and the substrate and excellent wear resistance. This article may be used as formed, or alternatively, may be cut, stamped, curled, flanged or otherwise formed into a desired geometry.

In an alternative preferred embodiment for forming a bearing of this invention, rather than bonding to a substrate, the "pre-preg" may be simply cured between release layers in the manner described above, then the resulting article may be used as formed (e.g., in sheet, tube, etc., geometry) or may be further cut (e.g., washers or the like), stamped, curled, flanged, etc., to provide a form suited to a particular bearing application.

A further alternative preferred embodiment for forming a bearing material of this invention is to first cure the "pre-preg" between release layers as described above, then subsequently laminate a pressure sensitive adhesive to this composite layer, either with or without the further forming techniques noted above, thus providing a "peel and stick" bearing article, that can be applied to any substrate surface at any time.

A further alternative technique for forming a bearing material of the present invention is by dry blending at least one epoxy resin powder with PTFE prior to processing the PTFE to form a porous monolithic form, or coagulation, of PTFE dispersion with various resin materials. The resultant resin-containing blends can then be made into various articles, to create the desired bearing composite. For example, U.S. Pat. No. 4,096,227, to Gore, gives examples for achieving such a result. The resulting structures can then be cured as described above and incorporated into a form of a bearing material of the present invention.

The resulting bearing materials of this invention may be used in a variety of industrial, aerospace, medical, agricultural and other applications where the advantageous features of low-friction, or lubriciousness, and wear-resistant load bearing are desirable. Exemplary articles contemplated may include, but clearly are not limited to, bearings, washers, clutches, tensioning devices, wear-resistant surfaces, and the like, in the form of three-dimensional articles, coatings, surfaces, etc.

Bearing samples in the present invention were prepared according to the procedure described above for bonding to a steel plate, then they were tested for their resistance to wear based upon the wear tests described below.

Test Methods

Wear Test

Apparatus:

A testing device was made substantially in accordance with ASTM D 3702. The apparatus is designed to test the wear rate of self-lubricating materials and utilizes a thrust washer specimen configuration. The test machine is operated with a stationary test sample, and a steel rotating test specimen against the sample, under load. All samples were tested at a load of 26 pounds (130 psi) and a velocity of 540 rpm (150 fpm). In order to apply the correct load and speed, a fixture was designed to fit in a Bridgeport milling machine Model J Head Series II. The fixture was spring loaded so that, when compressed to the appropriate distance, it applied a 26 pound load. The milling machine was able to control the amount of compression and the speed at which the fixture operated. See FIGS. 1 and 2 for schematic drawings of the rotating test specimen and the test fixture, respectively.

Rotating Test Specimen:

The rotating test specimen was made of 1018 stainless steel, with a finish of 8–12 μ-inch. A diagram of the specimen is shown below. The specimen was exactly copied from the ASTM D 3702 test and is shown schematically in FIG. 1.

Figure 2:
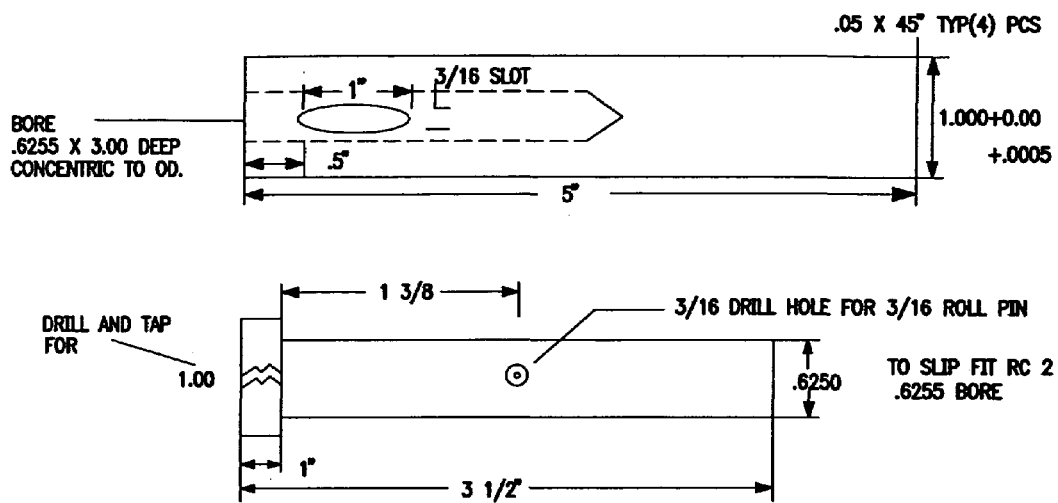

Test Fixture:

The test fixture was designed to hold the rotating test specimen and apply a constant load. A schematic drawing of the fixture is shown in FIG. 2.

Figure 3:
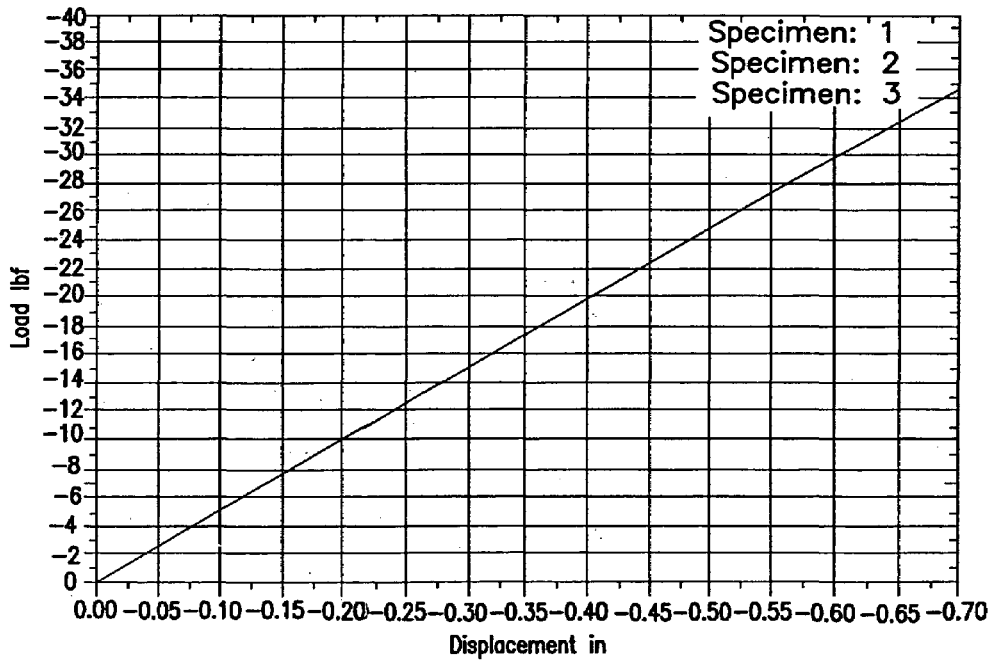
FIG. 3 is a graph of the load vs. compression for the test fixture shown in FIG. 1 during wear testing.

After the fixture was assembled, it was placed on an INSTRON® Universal Material Test Machine Model No. 5567, (Instron Corporation, Canton, Mass.) to determine the amount of compression required for 26 pounds of load. FIG. 3 is a graph of the load vs. compression for the fixture.

Test Procedure:

Each sample was tested in the following manner. First, the fixture was mounted in the milling machine and aligned perpendicularly to the base upon which the sample was mounted. This was done to ensure the rotating test specimen would be level on the test sample. Next, the test sample and rotating specimen were cleaned with isopropyl alcohol to eliminate any oils from the system. The test sample was then mounted to the base of the milling machine. Each time a sample was tested a new rotating specimen was mounted to the fixture. Before the test was started, the milling machine was turned on and set to 540 rpm, using a tachometer. The machine was then stopped and the test sample was brought into contact with the rotating specimen.

A 0.001 inch thick metal shim was placed on the test sample, then the fixture was lowered until it just engaged the shim. The shim was then removed, and the base of the milling machine was raised to compress the spring the correct amount (0.550 inch). The milling machine was then turned on, and the wear test was started. The test was run for the desired time, as noted in the examples.

After the test, the sample was removed and examined for the amount of wear that had occurred. An optical interferometer was used to measure the wear "scar". The sample was measured in four locations, and an average scar depth and width were determined. Wear "scars" were measured using a Zygo New View 5000 Scanning White Light Interferometer (Lambda Photometrics, Hertfordshire, UK). Results were obtained using a 5× objective (2.72 micron laternal resolution) and 0.5× zoom (4.53 micron camera resolution) with an appropriate bipolar (up to 145 microns) or extended (up to 500 microns) scan. Z-axis resolution was better than 1 µm. Stage tilt and pitch were adjusted to make surfaces outside the wear scar parallel to the optics before data collection.

Scar depths were quantified using histograms. Because images were carefully flattened with respect to the optics, the highest part of the image was the surface outside the groove. Date from this image produced the peak with the largest x-axis value in the histogram. This value was taken as the average position of the sample outside the scar. The scar bottom produced a second peak at lower x-axis in the histogram. The distance between the peaks measured from the scar and the area outside the scar was defined as the scar depth.

Coefficient of Friction Test

Coefficient of friction testing was carried out at Micro Photonics Inc., located in Irvine, Calif. The test apparatus used was a pin-on-disk tribometer and the test was run in accordance with ASTM G 99-95a. Results are reported as mean Coefficient of Friction.

Bubble Point

Liquids with surface free energies less than that of stretched porous PTFE can be forced out of the structure with the application of a differential pressure. This clearing will occur from the largest passageways first. A passageway is then created through which bulk air flow can take place. The air flow appears as a steady stream of small bubbles through the liquid layer on top of the sample. The pressure at which the first bulk air flow takes place is called the bubble point and is dependent on the surface tension of the test fluid and the size of the largest opening. The bubble point can be used as a relative measure of the structure of a membrane and is often correlated with some other type of performance criteria, such as filtration efficiency.

The Bubble Point was measured according to the procedures of ASTM F316-86. Ethanol was used as the wetting fluid to fill the pores of the test specimen.

The Bubble Point is the pressure of air required to displace the ethanol from the largest pores of the test specimen and create the first continuous stream of bubbles detectable by their rise through a layer of isopropyl alcohol covering the porous media. This measurement provides an estimation of maximum pore size.

Air Flow—Gurley

The resistance of samples to air flow was measured by a Gurley densometer manufactured by W. & L.E. Gurley & Sons in accordance with the procedure described in ASTM Test Method D726-58. The results are reported in terms of Gurley Number, or Gurley-Seconds, which is the time in seconds for 100 cubic centimeters of air to pass through 1 square inch of a test sample at a pressure drop of 4.88 inches of water.

EXAMPLES

Example 1

Figure 4:
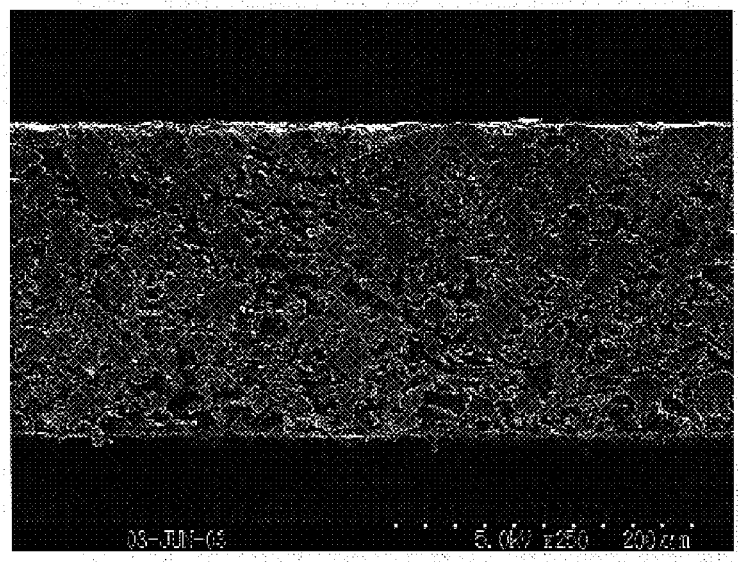
FIG. 4 is a cross-sectional perspective photomicrograph at 250× magnification of the porous monolithic PTFE of Example 1 prior to imbibing with the epoxy.

A sample of ZITEX G-108 porous PTFE sheet material was obtained from Saint-Gobain Performance Plastics (Taunton, Mass.), measuring 0.008 inch thick, and having a density of 1.21 g/cc and an ethanol bubble point of 1.0 psi. The microstructure of this un-imbibed material is shown in FIG. 4.

The sample was imbibed in the following manner. An epoxy resin composition was formulated with a blend of 56.4% EPON™ SU-3 (Resolution Performance Products), 18.8% EPON™ SU-8 and 24.8% ARADUR® 976-1 (Huntsman Advanced Materials, Basel, Switzerland). The epoxy blend was solvated to a 30% solid solution using MEK as a solvent. The material sample was placed on a 6" diameter wooden hoop and restrained. The sample was first wetted with 100% MEK solution. The epoxy solution was then applied to the PTFE sample by using a foam brush. The MEK was evaporated and subsequent epoxy solution coatings were applied until the microstructure was filled to a level of 30% by weight (44 volume percent of solids) of epoxy to PTFE. Then the hoop was put into a 65° C. oven for 10–15 minutes to remove the MEK completely. The sample was then in the "pre-preg" form. The "pre-preg" was then removed from the hoop, trimmed and bonded to a carbon steel plate measuring 6 inch by 6 inch by 0.0625 inch thick. The bonding was done as previously described. The sample was then tested for wear resistance, and the results are reported in Table 1.

Example 2

Figure 5:
FIG. 5 is a cross-sectional perspective photomicrograph at 600× magnification of the expanded PTFE membrane of Example 2 prior to imbibing with epoxy
Figure 6:
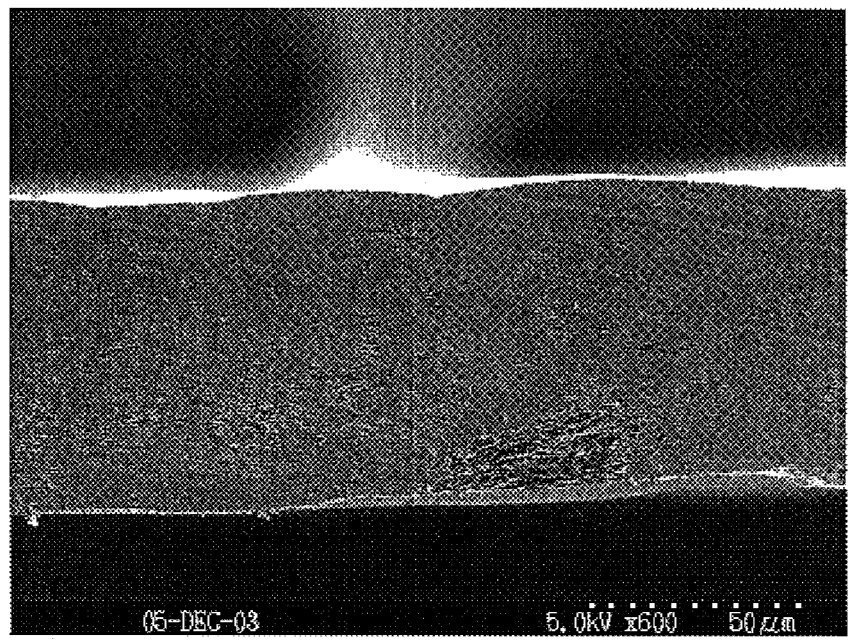
FIG. 6 is a cross-sectional perspective photomicrograph at 600× magnification of the expanded PTFE membrane of Example 2 after imbibing and curing the epoxy.

A sample of GORE-TEX® expanded PTFE membrane was obtained (W. L. Gore and Associates, Inc., Elkton, Md.) having a thickness of 3.7 mils, a density of 0.42 g/cc, a bubble point of 16.9 psi, and Gurley Number of 13 sec. The sample was imbibed with an epoxy resin as described in Example 1. The amount of epoxy imbibed was 30% by weight (44% by volume). The sample was bonded to a 6 inch by 6 inch carbon steel plate as previously described. FIGS. 5 and 6 are cross-sectional SEM photomicrographs of the structure prior to imbibing and after imbibing and curing, respectively.

Example 3

A sample of the GORE-TEX® expanded PTFE membrane used in Example 2 was obtained (W. L. Gore and Associates, Inc., Elkton, Md.). The sample was imbibed with an epoxy resin as described in Example 1. The amount of epoxy imbibed was 69% by weight (80.3% by volume). The sample was bonded to a 6 inch by 6 inch carbon steel plate as previously described, and subsequently tested for wear resistance. Test results are reported in Table 1.

Example 4

A filled ePTFE membrane was made by coagulating graphite particulate filler (Type 4437, obtained from Asbury Company) with PTFE fine powder dispersion at a ratio of 25 weight percent graphite to 75 weight percent PTFE. A uniaxially expanded membrane was then made as per the teachings in U.S. Pat. No. 3,953,566, to Gore. The membrane was expanded at a ratio of 4:1, and had a thickness of 0.006 inch and a density of 0.60 g/cc. The sample of this material was then imbibed as in Example 1. The final composition comprised by weight about 50% PTFE, 16.7% graphite and 33.3% epoxy (47.8% by volume epoxy). The sample was then bonded to a 6 inch by 6 inch carbon steel plate as previously described and tested for wear resistance. Results are reported in Table 1.

Example 5

Figure 7:
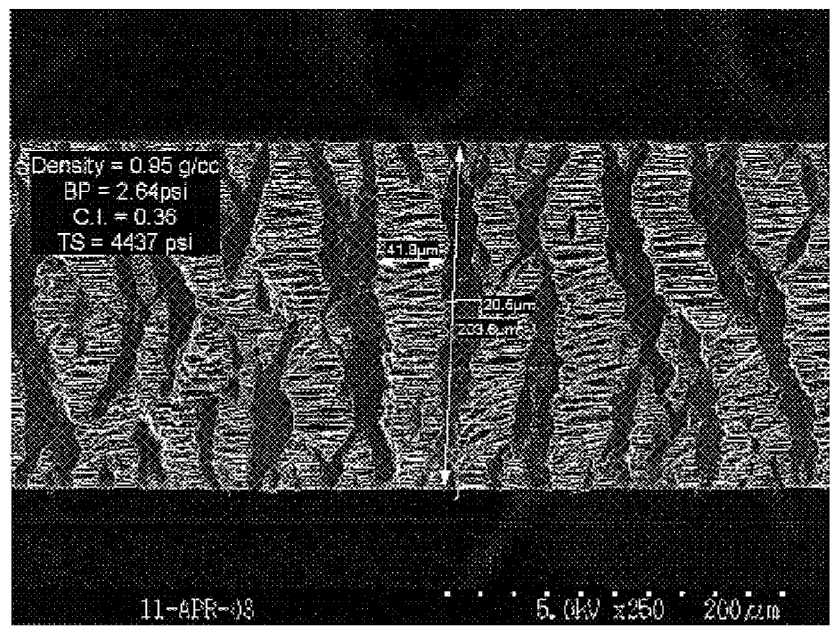
FIG. 7 is a cross-sectional perspective photomicrograph at 250× magnification of the expanded PTFE membrane of Example 5 prior to imbibing with epoxy.

An ePTFE material sample measuring 8 inches by 8 inches with a thickness of 0.008 inch was obtained (W. L. Gore and Associates, Inc.) having a microstructure as shown in FIG. 7 and the following properties: density=0.95 g/cc, ethanol bubble point=2.64 psi, and tensile strength=4437 psi.

Figure 8:
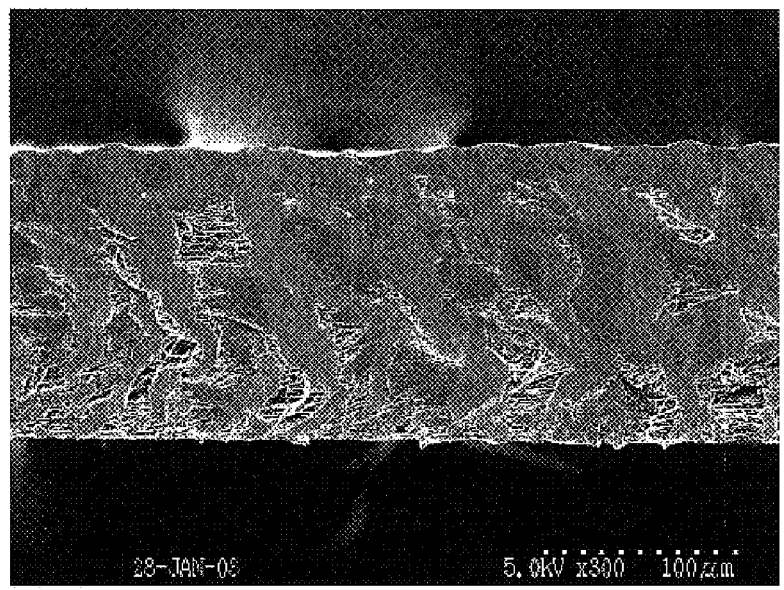
FIG. 8 is a cross-sectional perspective photomicrograph at 300× magnification of the expanded PTFE membrane of Example 5 after imbibing and curing the epoxy.

The sample was imbibed in the following manner. An epoxy resin composition was formulated with a blend of 56.4% EPON™ SU-3 (Resolution Performance Products), 18.8% EPON™ SU-8 and 24.8% ARADUR® 976-1 (Huntsman Advanced Materials, Basel, Switzerland). The epoxy blend was solvated to a 30% solid solution using MEK as a solvent. The material sample was placed on a 6" diameter wooden hoop and restrained. The sample was first wetted with 100% MEK solution. The epoxy solution was then applied to the ePTFE sample by using a foam brush. The MEK was evaporated and subsequent epoxy solution coatings were applied until the microstructure was filled to a level of 30% by weight (44 volume percent of solids) of epoxy to PTFE. To be specific, the composition of 100 g of the composite would consist of 30 g epoxy and 70 g PTFE. Then the hoop was put into a 65° C. oven for 10–15 minutes to remove the MEK completely. The sample was then in the "pre-preg" form. The "pre-preg" was then removed from the hoop, trimmed and bonded to a carbon steel plate measuring 6 inch by 6 inch by 0.0625 inch thick. The bonding was done as previously described. The sample was then tested for wear resistance, and the results are reported in Table 1. FIG. 8 shows the cross-section of the structure of FIG. 7 (unimbibed) after imbibing and curing.

Coefficient of friction (COF) of the material of this example was also determined by subjecting a sample to the Coefficient of Friction Test, described above. A sample of the composite material made in this Example was bonded to a 1 ⅝ inch diameter piece of carbon steel, using the bonding technique previously described herein. The steel sample was ¼" thick, and had been ground flat with a grinding wheel. The sample was then mounted to the pin-on-disc apparatus and tested at the following conditions:

Load: 3.5N
Speed: 105 cm/s
Radius: 17 mm
Ambient Temperature: 23C
Pin type: Ball
Ball Diameter: 6 mm
Ball Material: Steel 440C
of Laps: 35,000

Figure 9:
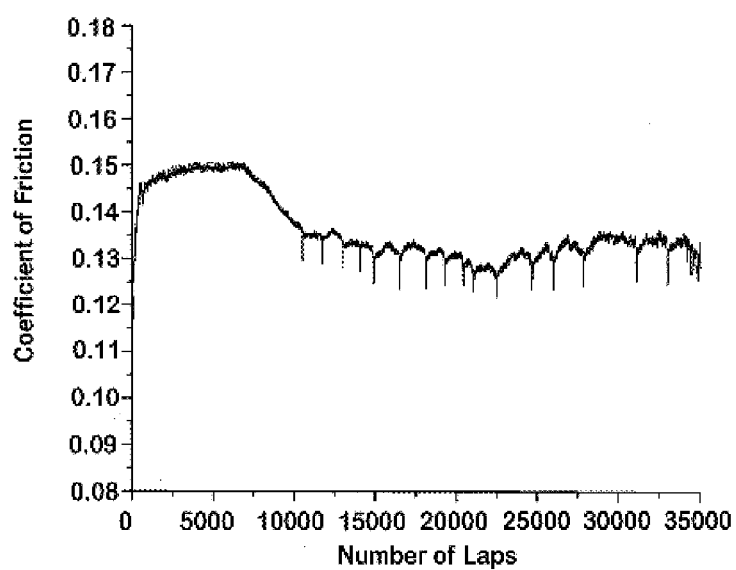
FIG. 9 is a graph showing the Coefficient of Friction vs. Number of Laps for the bearing material of Example 5.

The graph shown in FIG. 9 shows the COF as a function of the number of laps. The mean COF was 0.136

TABLE 1

Wear Resistance of Bearing Examples

| Example # | Weight % Epoxy | Volume % epoxy (solids) | 24 hr. Wear (depth in microns) |
|---|---|---|---|
| 1 | 30 | 44 | 6 |
| 3 | 69 | 80.3 | 14 |
| 4 | 33 | 47.8 | 13.5 |
| 5 | 30 | 44 | 4 |

COMPARATIVE EXAMPLES

Comparative Example 1

GARLOCK DU™ Bearing Material

Figure 10:
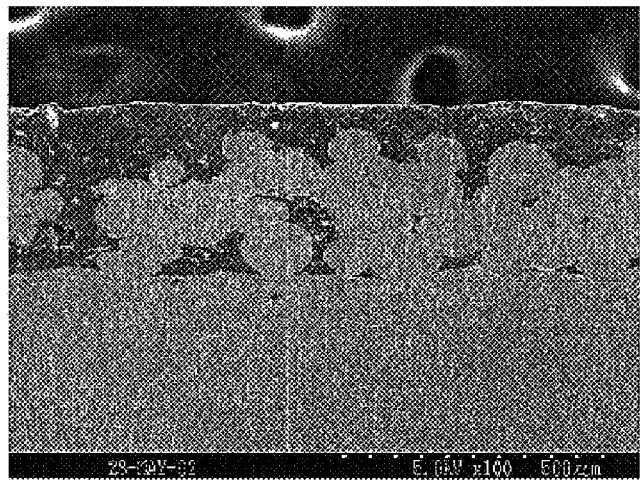
FIGS. 10, 11, 12 and 13 are cross-sectional perspective photomicrographs of the bearing materials of Comparative Examples 1, 2, 3 and 4, respectively.

A 6 inch by 6 inch sample of Garlock DU™ bearing material was obtained from the Glacier Garlock Bearings Company (Heilbronn, Germany). The sample was tested for wear resistance as previously described, and results are reported in Table 2. FIG. 10 is a photomicrograph taken at 100× magnification showing in cross-section the microstructure of the DU™ Bearing Material.

Figure 14:
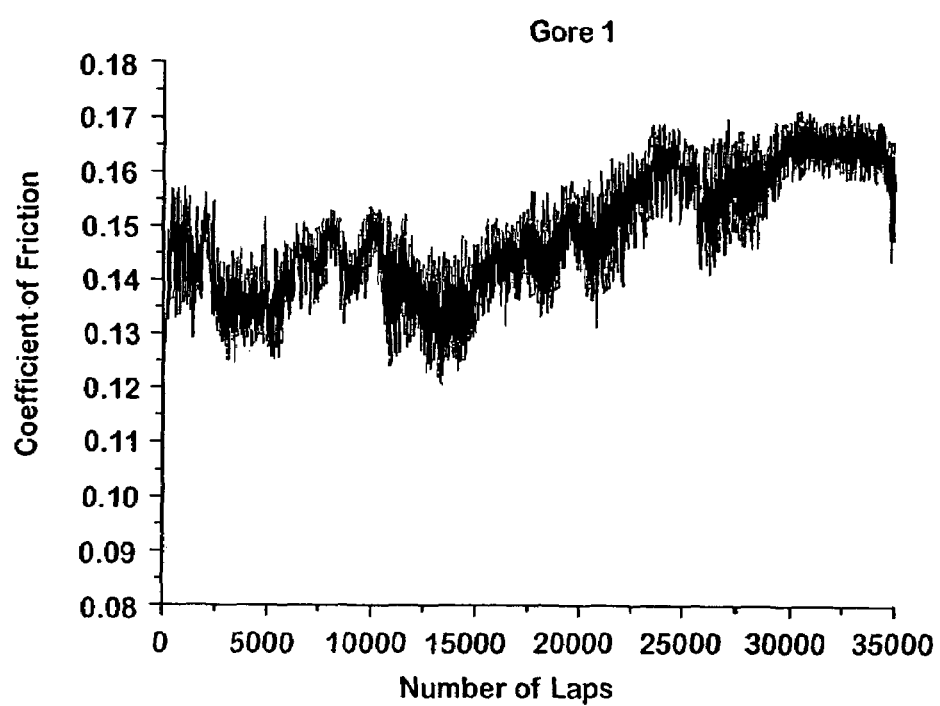
FIG. 14 is a graph showing the Coefficient of Friction vs. Number of Laps for the material of Comparative Example 1.

For comparative evaluation, the DU™ bearing material was also tested for coefficient of friction using the Coefficient of Friction Test, described earlier, with the same test conditions identified in Example 1. The graph shown in FIG. 14 shows the COF as a function of the number of laps. The mean COF was 0.149.

Comparative Example 2

RULON® LR Bearing Material

Figure 11:
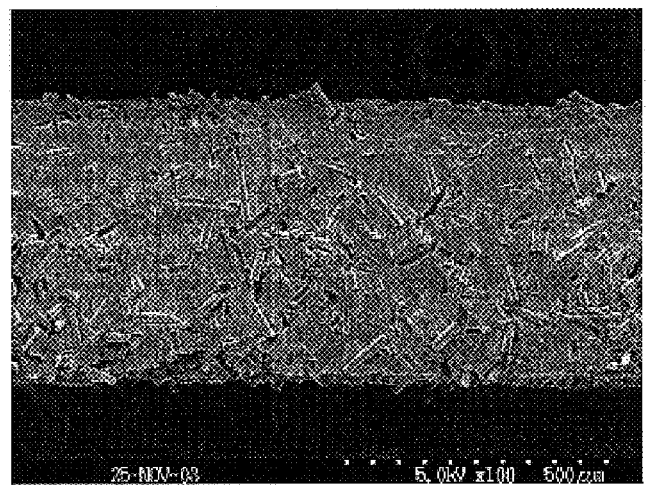

A 4 inch by 6 inch sample of RULON® LR bearing material, made by Saint-Gobain Performance Plastics (Taunton, Mass.) was obtained from Tri Star Plastic Corporation (Massachusetts). The sample of RULON® LR bearing material was bonded to a 6 inch by 6 inch by 0.0625 inch thick piece of carbon steel using 3M VHB™ pressure sensitive adhesive (St. Paul, Minn.). The sample was then tested for wear as in the other examples, and results are reported in Table 2. FIG. 11 is a photomicrograph taken at 100× showing in cross-section the microstructure of the RULON® LR Bearing Material.

Comparative Example 3

Skived PTFE

Figure 12:
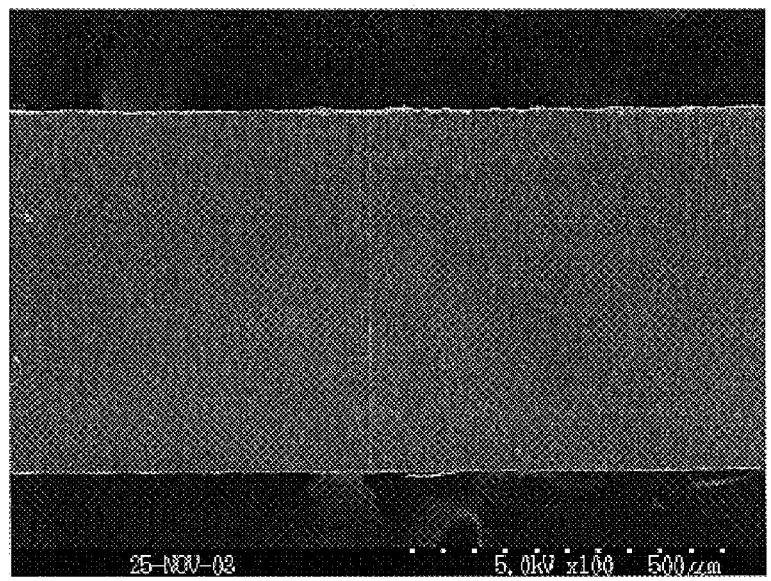

A 6 inch wide by 6 inch long sample of full density skived PTFE film was obtained from the McMaster Carr catalog (Part number 8569K12, 2 mil thick). The sample was etched on one side and bonded to a 6 inch by 6 inch by 0.0625 inch thick piece of carbon steel using 3M VHB™ pressure sensitive adhesive (Minnesota). This sample was also tested for wear resistance, and the results are reported in Table 2. FIG. 12 is a photomicrograph taken at 100× showing in cross-section the microstructure of the skived PTFE bearing material.

Comparative Example 4

NORGLIDE® PRO 1.0 T Bearing Material

Figure 13:
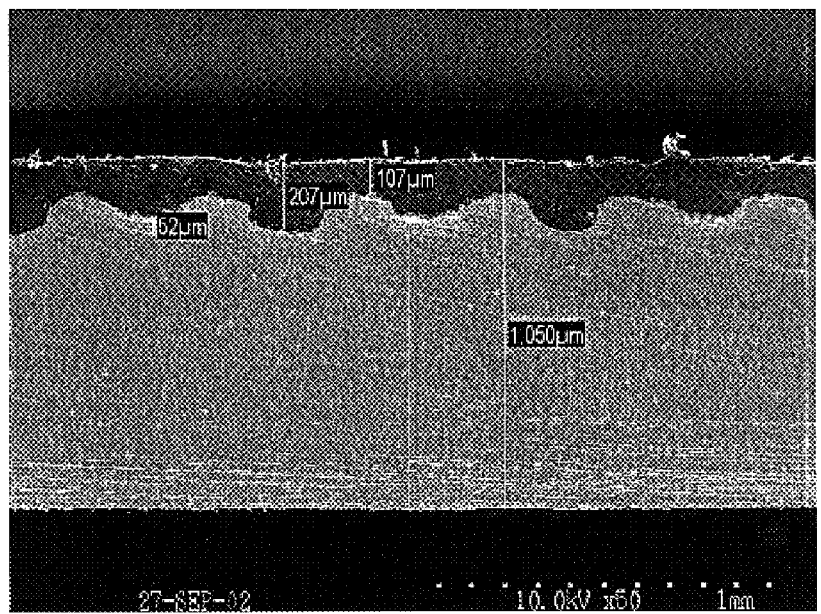

A sample of NORGLIDE® PRO 1.0 T bearing material was obtained from St.-Gobain Performance Plastics (Taunton, Mass.). This sample was tested, as received, for wear resistance, since it is already bonded to a metal substrate, and results are reported in Table 2. FIG. 13 is a photomicrograph taken at 50× showing in cross-section the microstructure of the NORGLIDE™ PRO 1.0 T bearing material.

TABLE 2

Wear Resistance of Comparative Examples

| Comparative Example # | Material Identification | Part # | 24 hr. Wear (depth in microns) |
|---|---|---|---|
| 1 | GARLOCK | DU | 19.3 |
| 2 | RULON | LR | 53.5 |
| 3 | Skived ptfe | N/a | 376.3 |
| 4 | NORGLIDE | Pro 1.0 T | 28.6 |

We claim:

1. A bearing article comprising:
   a porous monolithic PTFE material, wherein said PTFE comprises two or more layers, and
   at least one polymer resins selected from the group consisting of thermosetting resins and thermoplastic resins distributed within the pores of the PTFE material.

2. The bearing article of claim 1, in the form of a tube.

3. The bearing article of claim 1, wherein said at least one polymer resin comprises epoxy.

4. The bearing article of claim 1, wherein said at least one polymer resin comprises polyimide.

5. The bearing article of claim 1, in the form of a sheet.

6. A bearing article comprising:
   a porous monolithic PTFE material, and
   at least one wear resistant polymer resin distributed within the pores of the PTFE material, wherein said article further comprises a pressure sensitive adhesive bonded to said article.

7. A bearing article comprising:
   a porous monolithic PTFE material, wherein said PTFE further includes at least one filler, and
   at least one polymer resin selected from the group consisting of thermosetting resins and thermoplastic resins distribute within the pores of the PTFE material.

8. A bearing article comprising:
   a porous monolithic PTFE material, and
   at least one polymer resin selected from the group consisting of thermosetting resins and thermoplastic resins distributed within the pores of the PTFE material, wherein said article further comprises a pressure sensitive adhesive bonded to said article.

9. A bearing article comprising:
   a porous monolithic PTFE material, and
   at least one polymer resin selected from the group consisting of thermosetting resins and thermoplastic resins distributed within the pores of the PTFE material, said article further comprising at least one substrate bonded to said article.

10. The bearing article of claim 9, wherein said at least one substrate comprises at least one material selected from the group consisting of metal and epoxy.

11. A bearing article comprising:
    a porous monolithic PTFE material, wherein said PTFE material comprises two or more layers of PTFE, and
    at least one wear resistant polymer resin distributed within the pores of the PTFE material.

12. The bearing article of claim 11, wherein said at least one polymer resin comprises epoxy.

13. The bearing article of claim 11, wherein said at least one polymer resin comprises polyimide.

14. The bearing article of claim 11, in the form of a sheet.

15. The bearing article of claim 11, in the form of a tube.

16. A bearing article comprising:
    a porous monolithic PTFE material, wherein said PTFE further includes at least one filler, and
    at least one wear resistant polymer resin distributed within the pores of the PTFE material.

17. A bearing article comprising:
    a porous monolithic PTFE material, and
    at least one wear resistant polymer resin distributed within the pores of the PTFE material, said article further comprising at least one substrate bonded to said article.

18. The bearing article of claim 17, wherein said at least one substrate comprises at least one material selected from the group consisting of metal and epoxy.

19. A bearing article comprising:
    a composite comprising porous monolithic PTFE material, and at least one polymer resin selected from the group consisting of thermoset resins and thermoplastic resins distributed within the pores of the PTFE material, wherein said PTFE comprises two or more layers of PTFE; and
    a substrate bonded to said composite.

20. The bearing article of claim 19, wherein said at least one polymer resin comprises a polyimide.

21. The bearing article of claim 19, in the form of a wear-resistant surface.

22. The bearing article of claim 19, in the form of a bearing.

23. The bearing article of claim 19, in the form of a washer.

24. The bearing article of claim 19, in the form of a clutch.

25. The bearing article of claim 19, in the form of a tube.

26. The bearing article of claim 19, in the form of a sheet.

27. The bearing article of claim 19, in the form of a tensioning device.

28. The bearing article of claim 19, wherein said at least one polymer resin comprises an epoxy.

* * * * *

UNITED STATES PATENT AND TRADEMARK OFFICE
CERTIFICATE OF CORRECTION

| | | |
|---|---|---|
| PATENT NO. | : 7,147,378 B2 | Page 1 of 1 |
| APPLICATION NO. | : 10/783004 | |
| DATED | : December 12, 2006 | |
| INVENTOR(S) | : Chu et al. | |

It is certified that error appears in the above-identified patent and that said Letters Patent is hereby corrected as shown below:

Column 11, line 37, change "resins", to --resin--.
Column 11, line 58, change "distribute" to --distributed--.

Signed and Sealed this

First Day of May, 2007

JON W. DUDAS
*Director of the United States Patent and Trademark Office*